United States Patent
Awaji

(10) Patent No.: US 11,633,689 B2
(45) Date of Patent: Apr. 25, 2023

(54) DUST-CONTAINING GAS TREATMENT APPARATUS

(71) Applicant: Clean Technology Co., Ltd., Osaka (JP)

(72) Inventor: Toshio Awaji, Osaka (JP)

(73) Assignee: CLEAN TECHNOLOGY CO., LTD., Osaka (JP)

( * ) Notice: Subject to any disclaimer, the term of this patent is extended or adjusted under 35 U.S.C. 154(b) by 410 days.

(21) Appl. No.: 16/771,034

(22) PCT Filed: Nov. 20, 2018

(86) PCT No.: PCT/JP2018/042775
§ 371 (c)(1),
(2) Date: Jun. 9, 2020

(87) PCT Pub. No.: WO2019/116836
PCT Pub. Date: Jun. 20, 2019

(65) Prior Publication Data
US 2021/0178312 A1 Jun. 17, 2021

(30) Foreign Application Priority Data
Dec. 11, 2017 (JP) .............................. JP2017-237046

(51) Int. Cl.
*B01D 47/06* (2006.01)
*A46B 13/02* (2006.01)
(Continued)

(52) U.S. Cl.
CPC .............. *B01D 47/06* (2013.01); *A46B 13/02* (2013.01); *B03C 3/014* (2013.01); *F24F 8/133* (2021.01); *A46B 2200/30* (2013.01)

(58) Field of Classification Search
CPC ....... B01D 47/06; A46B 13/02; A46B 220/30; B03C 3/014; F24F 8/133
See application file for complete search history.

(56) References Cited

U.S. PATENT DOCUMENTS

| 4,846,856 A | * | 7/1989 | Burger | .................. B01D 47/16 96/53 |
| 5,607,487 A | * | 3/1997 | Taylor | ...................... B03C 3/86 48/128 |

(Continued)

FOREIGN PATENT DOCUMENTS

| JP | 49-148584 | 12/1974 |
| JP | 52-35953 | 8/1977 |

(Continued)

OTHER PUBLICATIONS

International Search Report dated Feb. 26, 2019 in corresponding International (PCT) Application No. PCT/JP2018/042775.

*Primary Examiner* — Christopher R Harmon
(74) *Attorney, Agent, or Firm* — Wenderoth, Lind & Ponack, L.L.P.

(57) ABSTRACT

In order to provide a dust-containing gas treatment apparatus which can smoothly achieve the treatment of gas containing dust of high concentration, the apparatus is equipped with a cylindrical treatment room to introduce gas containing dust and remove the dust from the gas, catcher consisting of brush with the hair planted in the support installed in the treatment room to catch the dust contained in the gas, liquid spraying mechanism installed in the treatment room, rotary driving mechanism to rotate the catcher and stirrer, gas introducing portion to introduce the gas containing dust, gas discharging portion to discharge the gas, the dust removed, from the treatment room and liquid discharging portion to discharge the liquid containing the dust removed from the gas.

7 Claims, 5 Drawing Sheets

(51) Int. Cl.
*F24F 8/133* (2021.01)
*B03C 3/014* (2006.01)

(56) References Cited

U.S. PATENT DOCUMENTS

| | | | | |
|---|---|---|---|---|
| 2004/0251122 | A1* | 12/2004 | Goswami | A61L 9/00 |
| | | | | 422/186 |
| 2007/0028569 | A1* | 2/2007 | Murphy | B01D 46/02 |
| | | | | 55/337 |
| 2014/0260972 | A1* | 9/2014 | Oh | B03C 3/41 |
| | | | | 95/64 |
| 2015/0013538 | A1* | 1/2015 | Oh | B03C 3/68 |
| | | | | 95/64 |
| 2021/0402413 | A1* | 12/2021 | Kim | F24F 8/10 |

FOREIGN PATENT DOCUMENTS

| | | |
|---|---|---|
| JP | 53-113271 | 10/1978 |
| JP | 433922 | 3/1992 |
| JP | 9-192447 | 7/1997 |
| JP | 2011-67740 | 4/2011 |
| JP | 2014-501606 | 1/2014 |

* cited by examiner

DUST-CONTAINING GAS TREATMENT APPARATUS

TECHNICAL FIELD

This invention concerns a dust-containing gas treatment apparatus to remove dust from gas containing dust.

BACKGROUND ART

As the dust-containing gas treatment to remove dust from gas, various dry and wet apparatuses have been proposed (for example, see patent literatures 1~2).

In many cases, such conventional dust-containing gas treatment apparatuses have the purpose of treating gas containing dust of low concentration such exhaust gas discharged from semiconductor manufacturing equipment, and a problem has been that they cannot smoothly treat when they are applied for treating gas containing dust of relatively high concentration.

LITERATURE OF PRIOR ART

Patent Literature

[Patent literature 1] Journal of Tokkai No. 2000-140546
[Patent literature 2] Journal Jitsu-Kaihei No. 4-65114

OUTLINE OF INVENTION

Problems to be Solved by the Invention

In consideration of the problems of the conventional dust-containing gas treatment apparatuses, this invention has the purpose of providing a dust-containing gas treatment apparatus which can smoothly treat gas of high concentration.

Means to Solve the Problems

In order to achieve the above purpose, the dust-containing gas treatment apparatus of this invention is characterized in that it is equipped with a cylindrical treatment room to introduce the dust-containing gas and remove the dust from the gas, a catcher consisting of brush with hair planted on the support to catch the dust contained in the gas, installed in the treatment room, liquid spraying mechanism installed in the treatment room, storage portion of the liquid dropping through the treatment room, rotary driving mechanism to rotate the catcher, gas introducing portion to introduce the dust-containing gas into the treatment room, gas discharging portion to discharge the gas dust removed, from the treatment room, and liquid discharging portion to discharge the liquid containing the dust removed from the gas.

In this case, it is possible to arrange a switching mechanism to change the aforementioned gas introducing and discharging portions to upper direction or lower direction of the treatment room.

It is also possible to arrange the liquid discharging portion at an upper position from the inner bottom face of the aforementioned liquid storage portion and the gas introducing and gas discharging portions at a higher position than that.

It is also possible to arrange the aforementioned liquid spraying mechanism at an intermediate position of the treatment room and use hydrophobic material for the hair of the catcher consisting of the brush at a higher position than that and hydrophilic material for the hair of the catcher consisting of the brush at a lower position.

It is also possible to install a stirrer for the aforementioned liquid storage portion and a rotary driving mechanism to rotate the stirrer.

The aforementioned treatment room can be divided into higher and lower portions.

The aforementioned liquid storage portion and liquid discharging portion can be shared by multiple dust-containing gas apparatuses.

The liquid recovered in the aforementioned liquid storage portion can be circulated to the liquid spraying mechanism.

Effect of the Invention

According to the dust-containing gas treatment apparatus, it is equipped with a cylindrical treatment room to introduce dust-containing gas and remove the dust from the gas, a catcher consisting of hair planted on the support to catch the dust contained in the gas, arranged in the treatment room, liquid spraying mechanism installed in the treatment room, storage portion of the liquid dropping through the treatment room, rotary driving mechanism to rotate the catcher, gas introducing portion to introduce dust-containing gas into the treatment room, gas discharging portion to discharge the gas dust-removed, and liquid discharging portion to discharge the liquid containing dust removed from the gas, so that the dust caught by the catcher is washed down by the liquid sprayed from the spraying mechanism and recovered in the storage portion of the liquid dropping through the treatment room, and the liquid containing dust is sequentially discharged via the liquid discharging portion from the liquid storage portion, thereby making it possible to treat the gas containing dust of high concentration, maintenance-free and smoothly without using a lot of liquid under low-load environment with less pressure loss.

In addition to the removal of the dust contained in the gas, it is simultaneously possible to make harmless the harmful gas contained in the gas by means of the liquid sprayed from the spraying mechanism.

By installing a switching mechanism to switch the aforementioned gas introducing and gas discharging portions to upper or lower direction of the treatment room, it is possible to securely treat the gas containing dust to be treated by switching the gas introducing portion and gas discharging portion in accordance with properties of the gas containing the dust to be treated.

By arranging the liquid discharging portion at a higher position than the inner bottom face of aforementioned liquid storage portion and the gas introducing and gas discharging portions at a higher position than that, it is possible to sequentially and safely discharge the liquid containing dust from the liquid storage portion.

By arranging the aforementioned liquid spraying mechanism at the intermediate position of the treatment room and using hydrophobic material for the hair of the catcher consisting of the brush at a higher position than that and hydrophilic material for the hair of the catcher consisting of the brush at a lower position, it is possible to discharge dry the gas discharged from the gas discharging portion and at the same to improve the dust removing efficiency of the catcher.

By installing a stirrer for the aforementioned liquid storage portion and installing a rotary driving mechanism to rotate the stirrer, it is possible to sequentially and securely discharge the liquid containing dust from the liquid storage portion via the liquid discharging portion, thus making it possible to treat more smoothly the gas containing dust of high concentration without using a lot of liquid.

By dividing the aforementioned treatment room into upper and lower portions, it is possible to conduct multiple treatments with a compact apparatus, such as dust removal and making harmful gas harmless.

By sharing the aforementioned liquid storage portion and liquid discharging portion with multiple dust-containing gas treatment apparatuses, it is possible to simplify the apparatus composition.

By circulating the liquid recovered in the aforementioned liquid storage portion to the liquid spraying mechanism, it is possible to reduce the liquid use and discharge quantities.

BRIEF DESCRIPTION OF DRAWINGS

[Drawing 1] Explanatory drawing to show Embodiment 1 of dust-containing gas treatment apparatus of this invention

[Drawing 2] Explanatory drawing to show Embodiment 2 of dust-containing gas treatment apparatus of this invention

Figure 1:
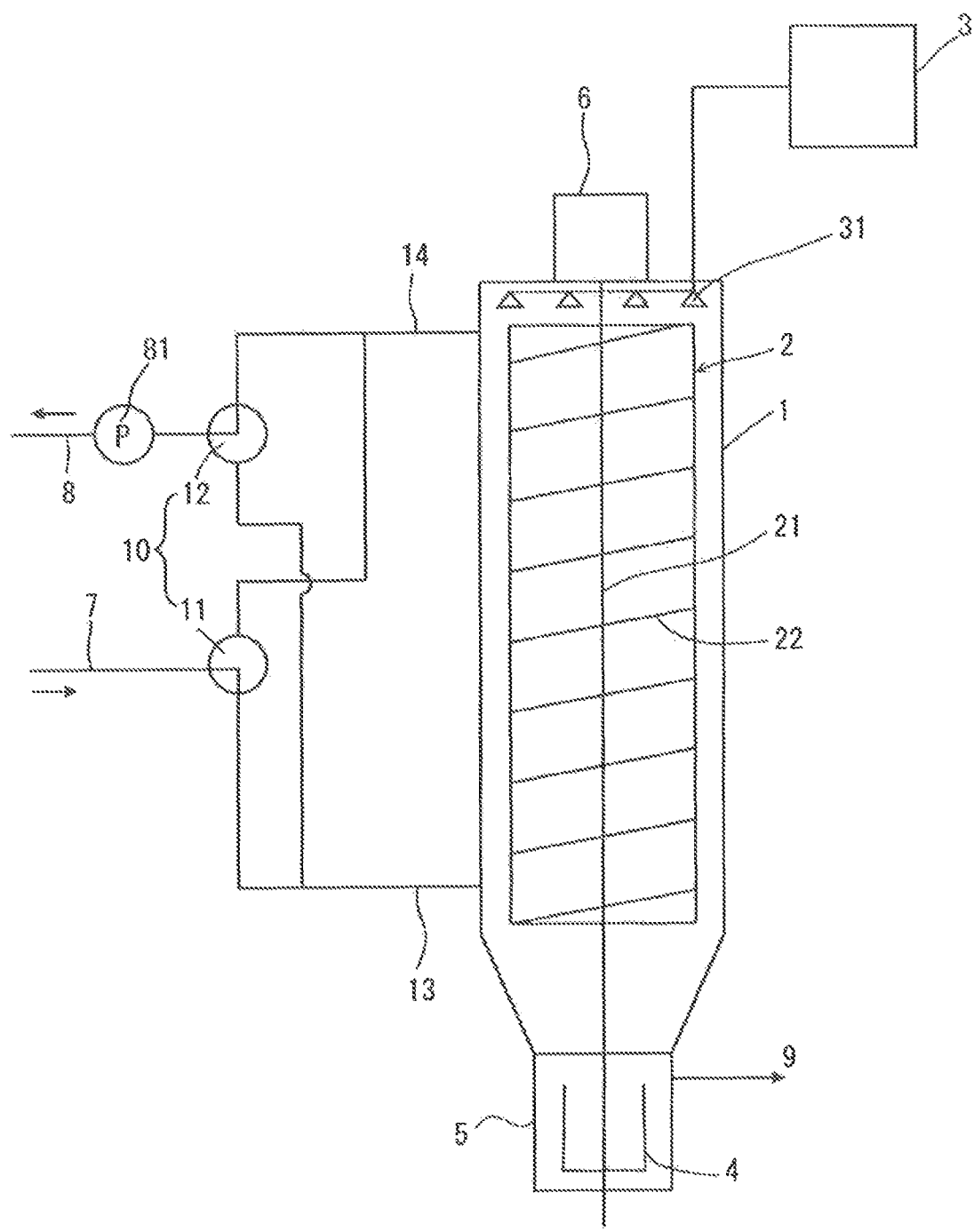
Figure 2:
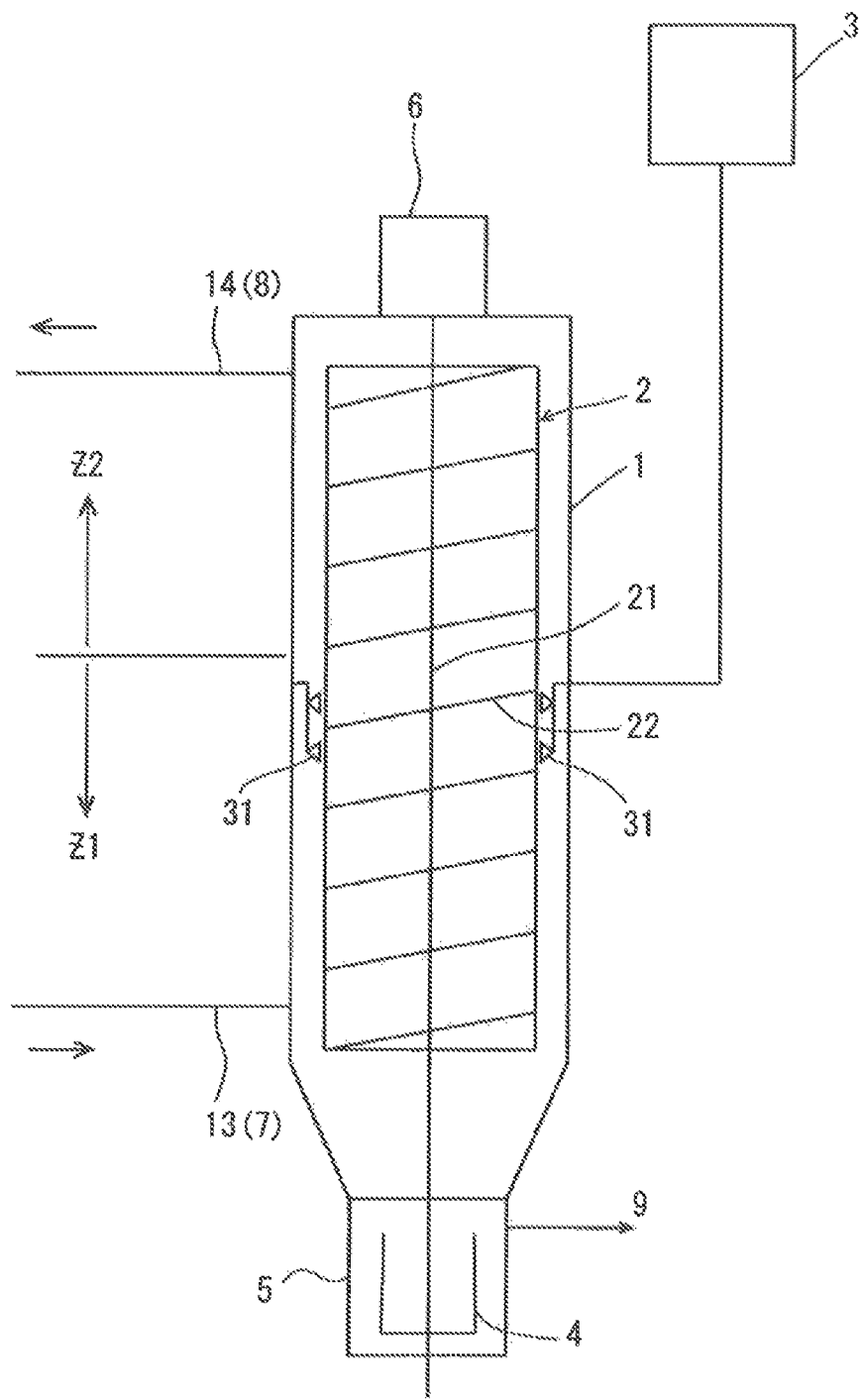
Figure 3:
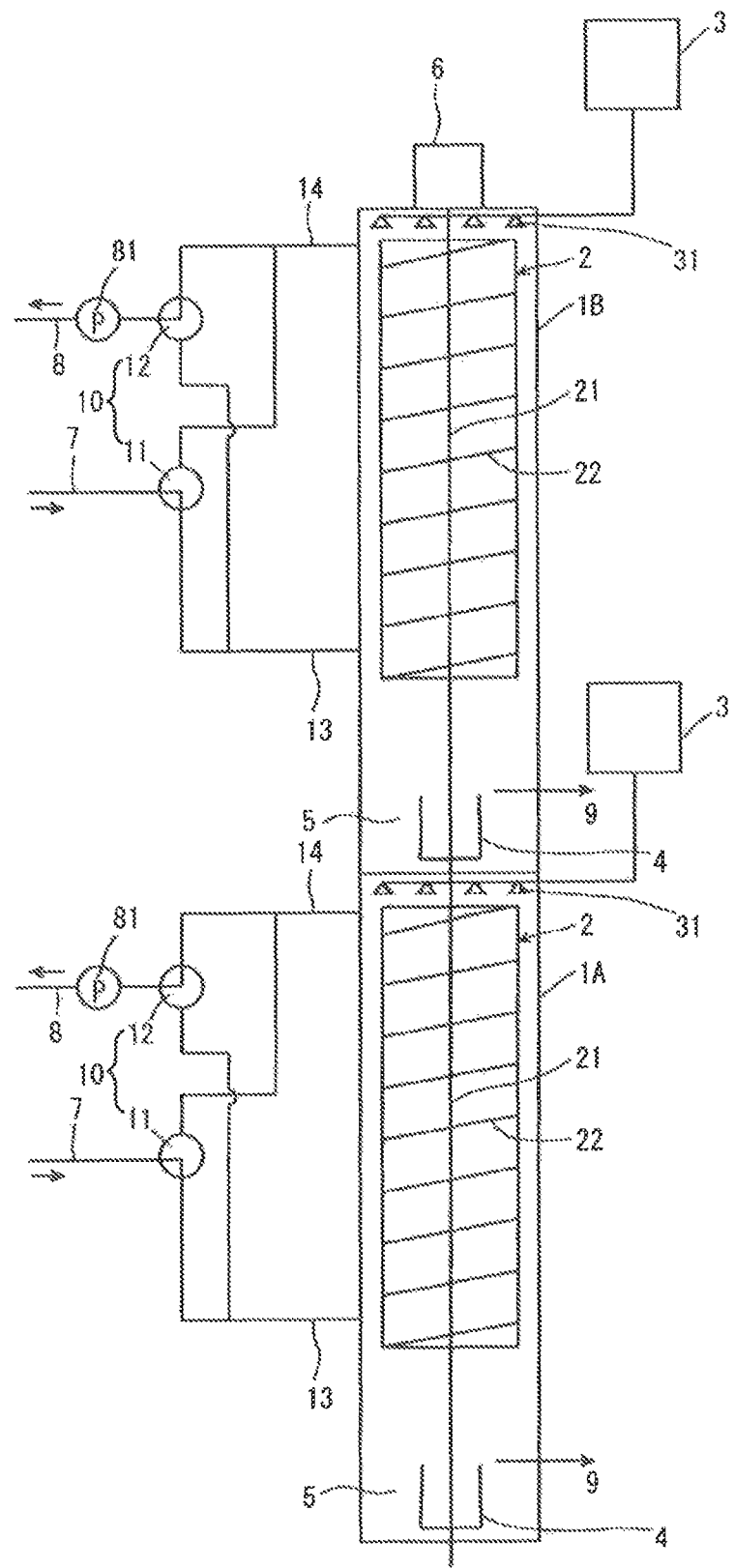
Figure 4:
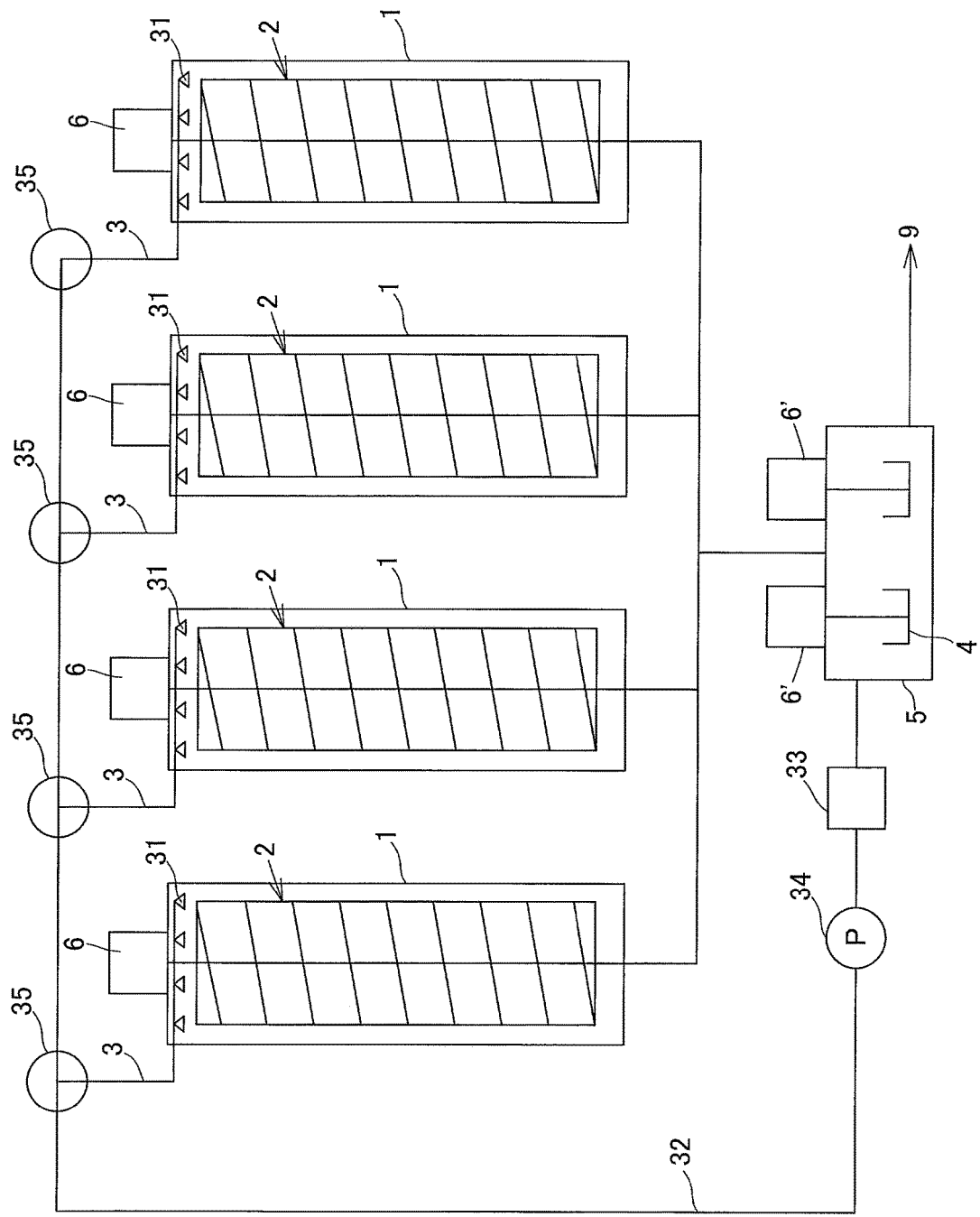
Figure 5:
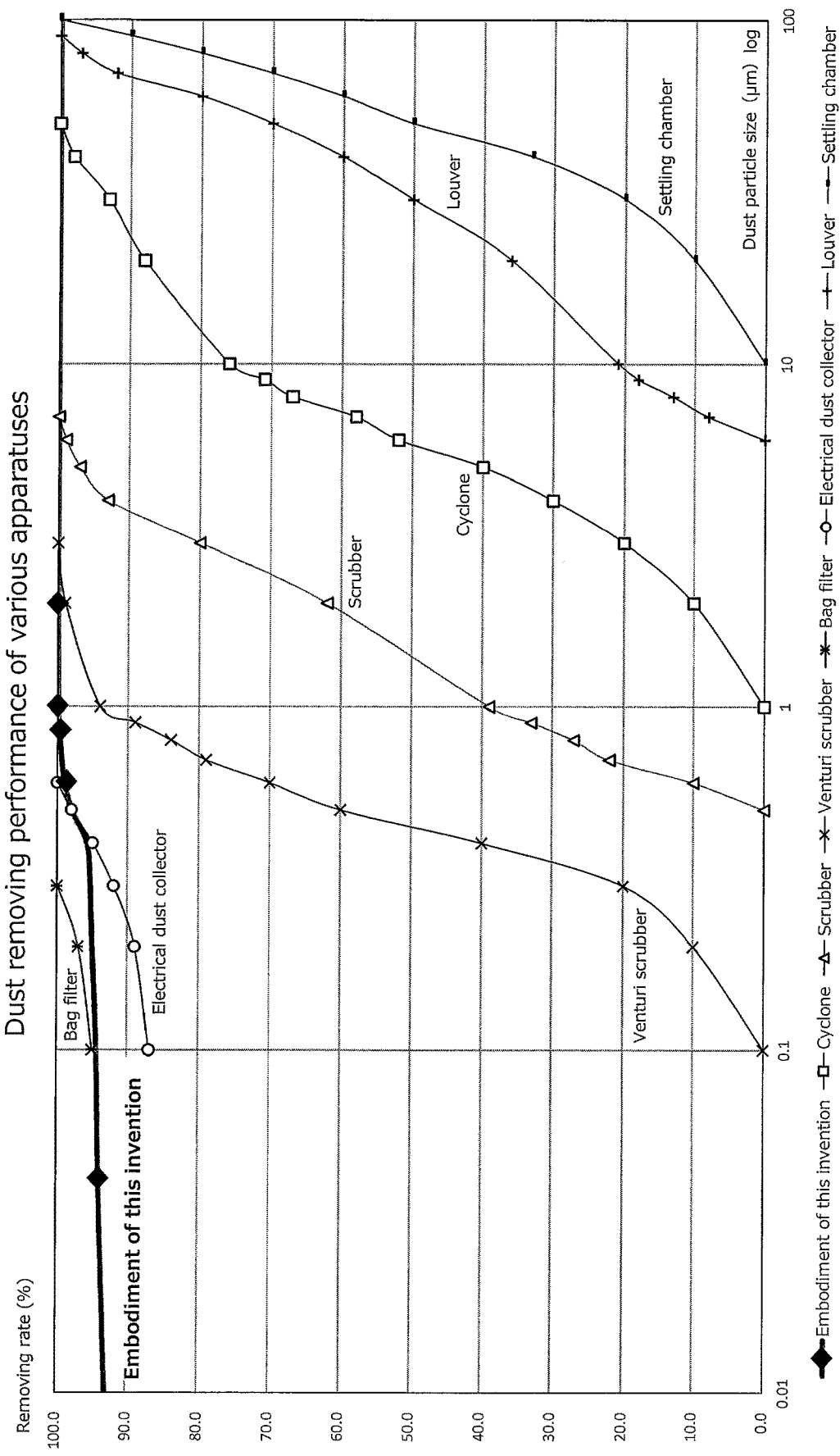

[Drawing 3] Explanatory drawing to show Embodiment 3 of dust-containing gas treatment apparatus of this invention

[Drawing 4] Explanatory drawing to show Embodiment 4 of dust-containing gas treatment apparatus of this invention

[Drawing 5] Explanatory drawing to show the dust-removing performance of various types of equipment including the dust-containing gas treatment apparatus of this invention

DETAILED DESCRIPTION OF THE PREFERRED EMBODIMENTS

The following explains the preferred embodiments of the dust-containing gas treatment apparatus of this invention in accordance with the drawings.

Drawing 1 shows Embodiment 1 of the dust-containing gas treatment apparatus of this invention.

This dust-containing gas treatment apparatus is to remove dust from gas containing dust, and is equipped with a tubular, preferably a cylindrical treatment room 1 to introduce the gas containing dust and remove the dust from the gas, catcher 2 consisting brush with hair 22 planted on support 21 to catch the dust contained in the gas, arranged in the treatment room 1, liquid spraying mechanism 3 installed in the treatment room 1, liquid storage portion 5 equipped with stirrer 4 formed at the lower part of the treatment room 1, rotary driving mechanism 6 to rotate the catcher 2 and stirrer 4, gas introducing portion 7 to introduce dust-containing gas into the treatment 1, gas discharging portion 8 to discharge the gas with the dust removed from the treatment room 1, and liquid discharging portion 9 to discharge the liquid containing the dust removed from the gas.

The brush with hair 22 planted in support 21 to form the catcher 2 includes a brush with hair 22 locally planted in the catcher 21 and brush with hair 22 planted diversely almost all the support 21.

As the brush with the hair 22 planted locally in a concentrated way, a spiral brush (this embodiment), disk brush, etc. are included.

The brush to form the catcher 2 is preferable that the end of the hair 22 planted in the support 21 is set in contact with the inside periphery of the cylindrical room 1.

This makes it possible that the inside periphery of the treatment room 1 is always kept clean by the brush forming the catcher 2.

The materials of the brush support 21 and hair 22 are not particularly limited, but considering the treatment temperature, if the treatment temperature is relatively low, such as ordinary temperature or room temperature to about 110° C., it is possible to use various types of synthetic resins such as polyethylene phthalate resin and polyamide resin of relatively low heat resistance or conductive synthetic resin mixed with conductive powder such as metal. If the treatment temperature is higher, synthetic resin of high heat resistance, conductive synthetic resin of high heat resistance mixed with conductive powder such as metal or metal is used. When the treatment temperature is raised, materials especially high in heat conductivity, metals such as copper, aluminum, iron and stainless steel or ceramic wool, or fiber formed by mixture of metal and ceramic is selected, thereby making it possible for the catcher to efficiently absorb the heat in the treatment room, and it a means to heat the catcher is provided, the heating of the heating means can be conveyed efficiently to the surface of the catcher, so that the treating capacity of the apparatus when starting can be sharply raised and the chemical treatment on the surface of the catcher is actively advanced, thus making it possible for the catcher to easily and efficiently catch solids produced through the chemical treatment.

The liquid spraying mechanism 3 installed in the treatment room 1 has nozzle 31 installed to a higher portion of the treatment room 1, preferably to the ceiling surface so that the liquid can be uniformly sprayed in the treatment room.

The installation position of the nozzle 31 is not limited to such a place, but it can be provided on the inside periphery surface or the support 21 of the brush to form the catcher 2.

For the liquid to be sprayed from the liquid spraying mechanism 3, it is possible to use water or liquid in accordance with the properties of the gas with dust to be removed, or chemical treatment conducted in the treatment room 1, specifically oxidizing, reducing, decomposing, or neutralizing.

The liquid storage portion 5 equipped with the stirrer 4 formed at the lower part of the treatment room 1 temporarily recovers and stores the liquid containing the dust caught by the catcher 2 and washed down by the liquid sprayed from the spraying mechanism 3, and sequentially discharges it via the liquid discharging mechanism 9.

The stirrer 4 is not limited in shape, so long as it can stir the liquid containing dust stored in the storage portion 5 and discharge it uniformed in concentration, and it is possible to adopt a rod shape, screw shape, or propeller shape.

Since this makes it possible to discharge the dust-containing liquid of the concentration uniformed, it is possible to smoothly treat the gas containing the dust of high concentration without using a lot of liquid. The stirrer 4 can be omitted depending on the properties of the gas containing the dust to be removed and the content of treatment.

The liquid storage portion 5 can be formed integral at the lower part of the treatment room 1 or removable in the treatment room 1 for the purposes of maintenance and treatment of large quantity of dust.

The rotary driving mechanism 6 to rotate the catcher 2 and stirrer 4 rotates them so as to enhance the catching effect of the dust to be caught by the catcher 2 and the effect of uniforming the concentration of the dust containing dust stored in the liquid storage portion 5 by means of the stirrer 4.

In this embodiment, the rotating shaft of the catcher 2 (brush support 21) and that of the stirrer 4 are made same and the rotary driving mechanism 6 is made common, but individual driving mechanisms can also be adopted. For the rotating shaft (brush support 21) of the catcher 2 and that of the stirrer 4, bearing is provided at both ends so that high-speed rotation of 1000 rpm, for example, is made possible, but it is possible to provide the bearing only at the upper end.

The number of revolutions of the catcher 2 is 100~2000 rpm, preferably 500~1800 rpm, more preferably 800~1500 rpm.

The gas introducing portion 7 and gas discharging portion 8 are connected so as to be able to change to the upper or lower part of the treatment room 1 via the switching mechanism 10 consisting of change-over valves 11, 12 and connecting pipings 13, 14.

The gas discharging 8 is equipped with the discharge pump 81.

This makes it possible to switch the gas introducing portion 7 or gas discharging portion 8 in accordance with the properties of the gas containing dust to be removed, and for example, gas containing dust with small specific gravity is introduced to the upper part of the treatment room 1 or gas containing dust with large specific gravity to the lower part of the treatment room 1, thus preventing the short pass of air flow, thus securing the treatment of dust-containing gas.

In this case, the liquid discharging portion 9 is installed at a higher position than the inside bottom surface of the liquid storage portion 5 and the connecting pipings 13, 14 of the gas introducing portion 7 and gas discharging portion 8 are installed at a position higher than that.

With this dust-containing gas treatment apparatus, the dust caught by the catcher 2 is washed down by the liquid sprayed from the spraying mechanism 3 and the liquid is temporarily recovered in the liquid storage portion 5 equipped with the stirrer 4 formed at the lower part of the treatment room 1 and the liquid containing dust is subsequently discharged via the liquid discharging portion 9 from the liquid storage portion 5, thus making it possible to achieve the treatment of the gas containing dust of high concentration, maintenance-free smoothly under low load environment with less pressure loss, without using a lot of liquid.

Simultaneously with the removal of dust contained in the gas, the harmful gas contained in the gas can be made harmless by the liquid sprayed from the spraying mechanism 3.

With the dust-containing gas treatment apparatus of the above Embodiment 1, the liquid can be uniformly sprayed through the treatment room 1 by installing the nozzle 31 of the liquid spraying mechanism 3 at the ceiling surface of the treatment room 1, but the nozzle 31 of the liquid spraying mechanism 3 can also be installed at the intermediate position of the treatment room 3 as the No. 2 embodiment of the dust-containing gas treat apparatus of this invention shown on Drawing 2.

In this case, it is preferable to use hydrophobic (hydrofuge) material such as synthetic resin such as polyolefine resin such as polypropylene, polyethylene phthalate resin or metal for the hair of the catcher 2 consisting of the brush at a higher position Z2 than it and hydrophilic material such as polyamide resin nylon, polyvinyl chloride resin, polyvinylidene chloride resin, etc. for the hair of the catcher 2 consisting of the brush at the lower position Z1.

This makes it possible to discharge dry the gas discharged from the gas discharging portion 8 by dropping the liquid with the catcher 2 consisting of the brush of the hair formed with the hydrophobic (hydrofuge) material at the higher position Z2 than the installation position of the nozzle 31 of the liquid spraying mechanism 3, and at the same time the dust is caught by the catcher 2 consisting of the brush of the hair formed with the hydrophilic material at the lower position Z1 than the lower position than the installation position of the nozzle 31 of the liquid spraying mechanism 3, thereby improving the dust removing efficiency.

In the dust-containing gas treatment apparatuses of the above Embodiment 1 and Embodiment 2, the treatment room 1 is made one room, but as the Embodiment 3 of the dust-containing gas treatment apparatus of this invention shown on Drawing 2, the treatment room can be divided into upper part and lower part.

Here the two treatment rooms 1A and 1B are basically equipped with the same mechanism as for the dust-containing gas treatment apparatuses of the above Embodiment 1 and Embodiment 2, and the rotating shaft of the catcher 2 (brush support 21) and that of the stirrer 4 can be made same and the rotary driving mechanism 6 can be made common. This makes it possible for an apparatus made compact to conduct multiple different treatments such as dust removal and making harmless the harmful gas contained in the gas.

Like Embodiment 4 of the dust-containing gas treatment apparatus of this invention shown on Drawing 4, the liquid storage portion 5 and liquid discharging portion 9 can be shared by multiple dust-containing gas apparatuses (in this case, the liquid storage portion 5 and liquid discharging portion 9 can be omitted or simplified from the dust-containing gas treatment apparatus) thereby simplifying the apparatus composition.

In this case, the liquid storage portion 5 can be equipped with the stirrer 4 and the rotary driving mechanism 6 to rotate the stirrer 4 can be provided.

The liquid recovered in the liquid storage portion 5 can be circulated to the liquid spraying mechanism 3 thereby reducing the liquid consumption and discharge quantity. In this case, the liquid circulating passage 32 can be provided, as required, with filter 33, pump 34 and selector valve 35.

In the dust-containing gas treatment apparatus equipped with the treatment room 1 of 200 mm in diameter, the liquid of several L/min to hundreds of L/min, preferably tens of L/min is normally sprayed from the liquid spraying mechanism 3, but through the circulated use of the liquid, the liquid consumption and discharge quantity can be reduced to $1/10$ or less of the liquid sprayed.

As aforementioned, the dust-containing gas treatment apparatuses described in the above Embodiment 1 to Embodiment 4 can achieve the treatment of the gas containing dust of high concentration under a low load environment with less pressure loss, maintenance-free and smoothly, without using a lot of liquid, and the dust removing performance of each apparatus is shown on Drawing 5. As clear from Drawing 5, it was confirmed that the dust-containing gas treatment apparatus of this invention demonstrated superior dust removing performance for dust of particle diameter in a wide range among various known apparatuses.

We have explained the dust-containing gas treatment apparatus of this invention in accordance with multiple embodiments, but this invention is not limited to the compositions described in the above embodiments and it is possible to change the composition as required within the range not deviating from the purpose such as combining the components described in the embodiments.

INDUSTRIAL APPLICABILITY

Since the dust-containing gas treatment apparatus of this invention has characteristics to smoothly achieve the treatment of gas containing dust of high concentration, it can be used suitably for the applications of the dust-containing gas treatment application for treating the gas containing dust of high concentration in semiconductor industry, automobile industry, plastic industry, resource industry, ceramic industry, powder metallurgy, detergent industry, catalyst industry, ferrite industry, color material industry, agricultural chemical industry, pharmaceutical industry feed industry, food industry, waste disposal industry, biological industry, cosmetic industry, etc. and in addition, it can be widely used as dust-containing gas treatment apparatus to treat gas containing dust of high concentration at building and civil-engineering work sites and for such applications as gas cleaning, air cleaning, disinfection, deodorizing, etc. because it can remove very small substances contained in gas.

EXPLANATION OF CODES

1 Treatment room
1A Treatment room
1B Treatment room
2 Catcher (brush)
21 Support
22 Hair
3 Liquid spraying mechanism
31 Nozzle
32 Liquid circulating passage
33 Filter
34 Pump
35 Selector valve
4 Stirrer
5 Liquid storage portion
6 Rotary driving mechanism
6' Rotary driving mechanism
7 Gas introducing portion
8 Gas discharging portion
9 Liquid discharging portion
10 Switching mechanism
11 Selector valve
12 Selector valve
13 Connecting piping
14 Connecting piping

The invention claimed is:

1. A dust-containing gas treatment apparatus for removing dust contained in gas, the apparatus comprising:
   a cylindrical treatment room into which gas is introduced and within which dust is removed from the gas;
   a gas introducing portion that introduces the gas into the treatment room;
   a liquid spraying mechanism installed at an intermediate position in the treatment room;
   a brush in the treatment room, the brush including a support and hair planted in the support, wherein the hair located above the intermediate position in the treatment room is made of a hydrophobic material;
   a storage portion that stores the liquid that has flowed down through the treatment room;
   a rotary driving mechanism to rotate the brush;
   a gas discharging portion that discharges the gas, with the dust removed, from the treatment room;
   a liquid discharging portion to discharge, from the storage portion, the liquid containing the dust removed from the gas;
   a switching mechanism to be able to switch between: (i) having the gas introducing portion introduce the gas at an upper part of the treatment room, and the gas discharging portion discharge the gas from a lower part of the treatment room; and (ii) having the gas discharging portion discharge the gas from the upper part of the treatment room, and the gas introducing portion introduce the gas at the lower part of the treatment room.

2. The dust-containing gas treatment apparatus described in claim 1, wherein the hair located below the intermediate position in the treatment room is made of a hydrophilic material.

3. The dust-containing gas treatment apparatus described in claim 1, wherein:
   the liquid discharging portion is arranged at a position higher than the inner bottom surface of the liquid storage portion; and
   the gas introducing portion and the gas discharging portion are located higher than that the liquid discharging portion.

4. The dust-containing gas treatment apparatus described in claim 1, further comprising a stirrer in the liquid storage portion, and a rotary driving mechanism to rotate the stirrer.

5. The dust-containing gas treatment apparatus described in claim 1, wherein the liquid recovered in the aforementioned liquid storage portion is circulated to the liquid spraying mechanism.

6. The dust-containing gas treatment apparatus described in claim 1, wherein the brush is a spiral brush.

7. The dust-containing gas treatment apparatus described in claim 1, further comprising a driving mechanism to rotate the brush at a rate in the range of 800 to 1500 rpm.

* * * * *